United States Patent [19]

Wahl et al.

[11] Patent Number: 4,646,574
[45] Date of Patent: Mar. 3, 1987

[54] PRESSURE GAUGE HOUSING MADE OF SYNTHETIC MATERIAL

[75] Inventors: Detlev Wahl, Erlenbach; Herbert Elter, Dammbach; Hermann Julien, Klingenberg, all of Fed. Rep. of Germany

[73] Assignee: Alexander Wiegand GmbH & Co., Klingenberg, Fed. Rep. of Germany

[21] Appl. No.: 719,536

[22] Filed: Apr. 3, 1985

[30] Foreign Application Priority Data

Apr. 6, 1984 [DE] Fed. Rep. of Germany ... 8410848[U]

[51] Int. Cl.⁴ .............................................. G01L 19/14
[52] U.S. Cl. .......................................... 73/741; 73/431
[58] Field of Search ................. 73/431, 741, 742, 743, 73/732, 756

[56] References Cited

U.S. PATENT DOCUMENTS

| 2,637,618 | 5/1953 | Ray | 73/431 X |
|---|---|---|---|
| 2,773,388 | 11/1956 | Prosser | 73/431 |
| 3,434,330 | 3/1969 | Ingham et al. | 73/431 X |
| 3,921,455 | 11/1975 | Staubli et al. | |
| 3,929,020 | 12/1975 | Honkanen | 73/741 X |
| 4,124,931 | 11/1978 | Miele, Jr. | 73/741 X |
| 4,520,668 | 6/1985 | Allemano | 73/732 X |

FOREIGN PATENT DOCUMENTS

| 60736 | 9/1982 | European Pat. Off. | 73/431 |
|---|---|---|---|
| 1273862 | 7/1968 | Fed. Rep. of Germany . | |
| 1648702 | 4/1971 | Fed. Rep. of Germany . | |
| 2847262 | 5/1980 | Fed. Rep. of Germany . | |
| 2358329 | 9/1981 | Fed. Rep. of Germany . | |
| 3414702 | 12/1984 | Fed. Rep. of Germany . | |
| 3414703 | 12/1984 | Fed. Rep. of Germany . | |
| 843 | of 1914 | United Kingdom | 73/431 |
| 2136127 | 9/1984 | United Kingdom . | |
| 2138944 | 10/1984 | United Kingdom . | |
| 2139759 | 11/1984 | United Kingdom . | |
| 559144 | 5/1977 | U.S.S.R. | 73/431 |

Primary Examiner—Stewart J. Levy
Assistant Examiner—Tom Noland
Attorney, Agent, or Firm—Saidman, Sterne, Kessler & Goldstein

[57] ABSTRACT

A pressure gauge housing (3) made of a synthetic material and having O-ring sealing seat (1) for the spring carrier (42). The housing features a protruding edge (2) which is molded on the front side on the cup-shaped housing (3). The O-ring sealing seat (1) is shaped out of the housing circumference so that it will close flush with the edge (2).

25 Claims, 6 Drawing Figures

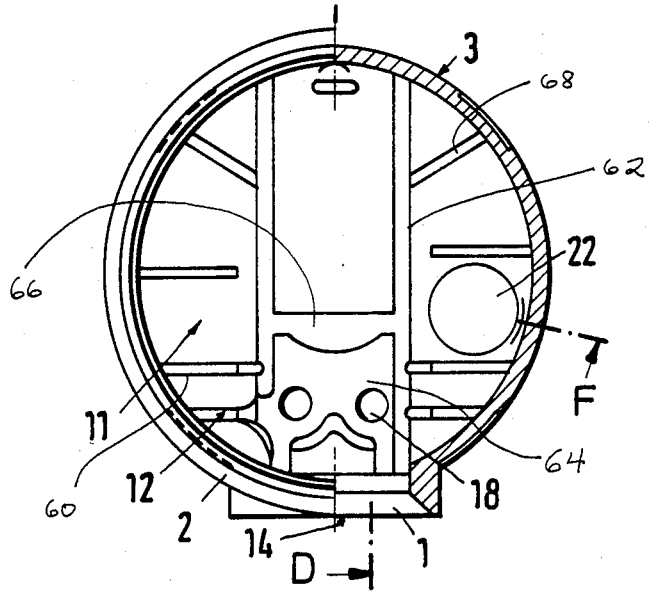
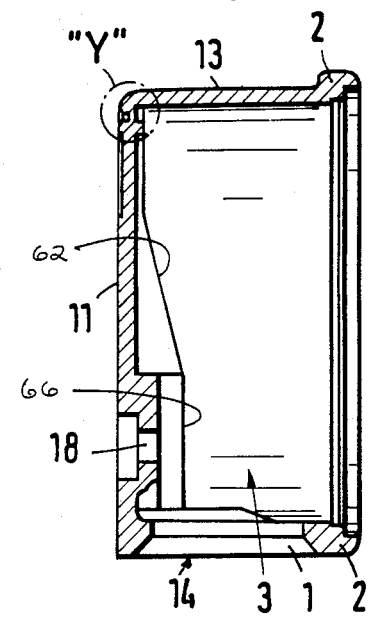
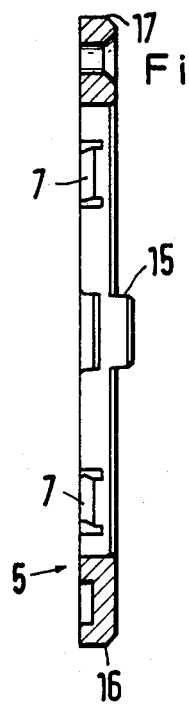
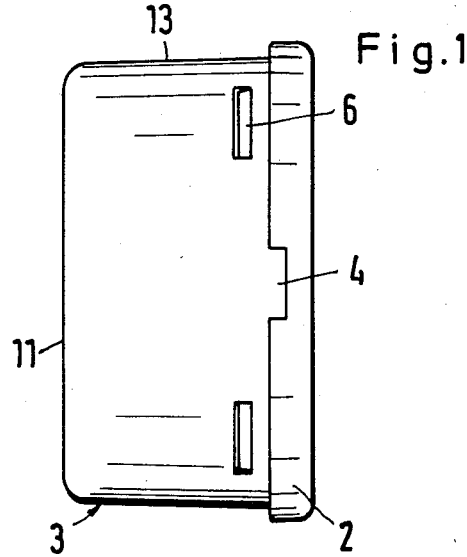
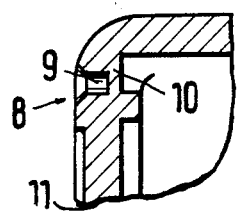

PRESSURE GAUGE HOUSING MADE OF SYNTHETIC MATERIAL

BACKGROUND OF THE INVENTION

1. Field of the Invention

This innovation relates to a pressure gauge housing made of synthetic material. More particularly, it relates to a fluid-filled pressure gauge that can make cost-effective pressure measurements under rough operating conditions.

2. Description of the Related Art

As is known, for fluid-filled pressure gauges, one uses pressed brass housings, synthetic material housings, or sheet-metal housings whose surfaces have been refined or consist of stainless steel with dry seals, in combination with press-on plates with O-ring seals and a divided spring carrier, or with seals made by casting techniques.

Front rings or other supporting devices used, for example, to install the gauges in measurement control rooms, are attached to the housing circumference with the help of retaining angles, clamps, or screws.

The pressed brass housings are of course absolutely fluid tight, but they require a great deal of effort in terms of mechanical processing. With the other housings, one primarily encounters sealing problems. The various types of accessory rings also require considerable mechanical effort, as does their attachment.

OBJECTS AND SUMMARY OF THE INVENTION

It is therefore a primary purpose of this invention to provide a pressure gauge housing which will be reasonably priced, which will meet all requirements, and which will replace a large number of variations in previously known housings.

The foregoing is achieved according to the present invention by the provision of a pressure gauge housing having a cup shape and made of synthetic material with which there is integrally molded a protruding edge along the front side of the cup-shaped housing. An O-ring sealing seat is shaped out of the housing circumference so that it will close flush with the protruding edge.

On the back side of the protruding edge of the cup-shaped housing, there is preferably formed an anti-twisting recess for receiving a front ring or for a cup-shaped attachment device.

A special advantage of the synthetic-material pressure gauge housing of the present invention is that, behind the protruding edge, there are uniformly distributed along the housing circumference at least three wedge-shaped depressions to provide a snap connection to affix the front ring or cup-shaped attachment device.

Another advantageous feature of the present invention is that the rear wall of the housing has a ventilation inlet and outlet aperture which comprises a blind hole having a slightly smaller depth than the thickness of the housing rear wall.

The housing of the present invention can furthermore be designed advantageously in that, on the inside of the housing rear wall, especially around the spring carrier gap, there are arranged ribs to enhance the fluid seal and the stability of the completed gauge.

The advantages of the invention are this: a fluid-filled pressure gauge housing can be made in one manufacturing operation, and sealing of the spring carrier, the ventilation inlet and outlet mechanism, and the attachability and installability at positions where the pressure measurements are taken are integrated through compatible accessory devices.

The stability of similar metallic housings is guaranteed by design measures, and additional surface protection against corrosion can be omitted.

BRIEF DESCRIPTION OF THE DRAWINGS

Various objects, features, and attendant advantages of the present invention will be more fully appreciated as the same becomes better understood from the following detailed description of the present invention when considered in connection with the accompanying drawings, in which:

FIG. 1 is a top view of one embodiment of a pressure gauge housing according to the present invention;

FIG. 2 is a cross-sectional view of an example of a front ring used with the present invention;

FIG. 3 is a front view, partly cut away, of the preferred embodiment of the pressure gauge housing of FIG. 1;

FIG. 4 is a side view, in cross-section, taken along line C-D of FIG. 3;

FIG. 5 is an enlarged view of a portion "Y" of FIG. 4 to illustrate the ventilation intake and outlet aperture.

DETAILED DESCRIPTION OF THE PREFERRED EMBODIMENT

Figure 6:
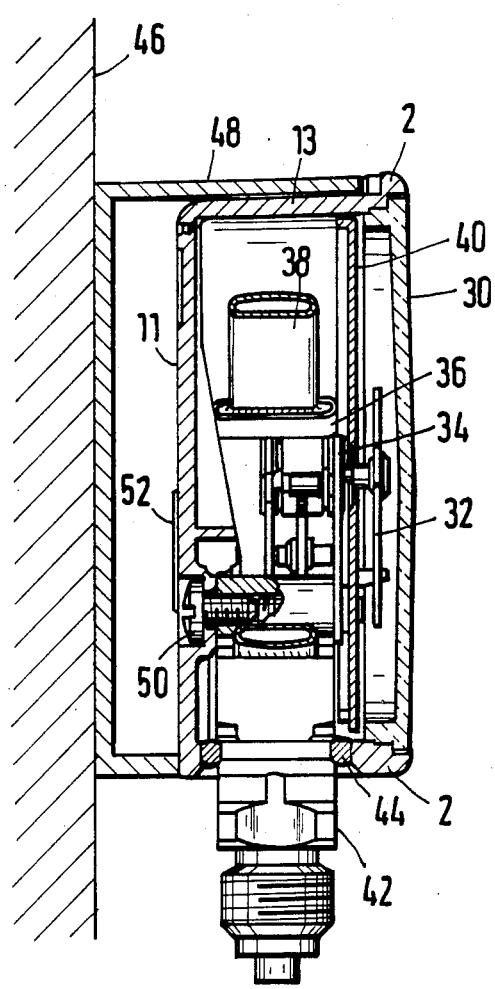
FIG. 6 is a cross-sectional view of a complete pressure gauge using the housing of the present invention.

Referring now to the drawings, wherein like reference numerals represent identical or corresponding parts throughout the several views, and more particularly to FIGS. 1, 3 and 4, there is illustrated a preferred embodiment of a pressure gauge housing, illustrated generally by reference numeral 3, according to the present invention. Housing 3 is generally cup-shaped and includes a substantially cylindrical side wall 13 at one end of which is integrally formed a substantially circular rear wall 11. At the other end of side wall 13 is integrally molded an edge 2 which protrudes beyond the outer periphery of side wall 13.

As seen in FIGS. 3, 4 and 6, at the bottom portion of housing 3, an opening 14 is provided through which a spring carrier 42 extends. An O-ring sealing seat 1 is formed to receive an O-ring 44 to close opening 14 tightly against the protruding edge 2 of housing 3.

FIG. 6 illustrates housing 3 of the present invention with other pressure gauge components assembled thereto. For example, the open end of housing 3 that is formed by protruding edge 2 is enclosed by a glass or plastic face 30. Face 30 protects a pointer 32 located behind it. Pointer 32 is, in turn, coupled through a gearing, indicated generally by reference numeral 34, which translates movement of the end 36 of a spring 38 into rotational movement of the pointer 32. The construction of spring 38 is preferably of the well-known Bourdon tube type.

Located in front of gearing 34 and behind pointer 32 is a dial face 40 having appropriate graduations imprinted thereon so that the pressure readings may be ascertained.

The spring 38 is supported by a spring carrier 42 that extends through opening 14 at the bottom of housing 3 as explained above. O-ring 44 seals the spring carrier gap formed between spring carrier 42 and protruding edge 2. A screw 50 extends through an aperture 18 formed in rear wall 11 for securing the spring carrier 42 inside housing 3.

FIG. 6 also illustrates one possible device for mounting the pressure gauge housing 3 to a support surface, such as wall 46. The apparatus comprises a cup-shaped supporting device 48 which is appropriately sized to receive the cylindrical wall 13 of housing 3 as illustrated. Cup-shaped supporting device 48 may be attached to side wall 13 in much the same manner as front ring 5 of FIG. 2, to be explained in greater detail below.

Referring back to FIG. 1, on the rear side of edge 2 there is formed an indentation or recess 4 designed to mate with a protrusion, such as protrusion 15 (see FIG. 2), of a front ring, such as front ring 5 of FIG. 2.

As seen in FIG. 2, front ring 5 includes a plurality of wedge-shaped elastic clamps 7 which are designed to snap-fit within wedge-shaped depressions 6 formed in the outer wall 13 of housing 3. Indentation 4 and protrusion 15 serve to prevent the respective devices from twisting. Front ring 5 also includes means 16 and 17 for fastening same to a panel in order to install housing 3 in a measurement control room or the like.

During operation, the pressure gauge housing 3 of the present invention is filled with fluid through bore 22 located in rear wall 11. Bore 22 is closed by a plug 52 (FIG. 6) after filling.

FIG. 5 illustrates an enlarged view of portion "Y" of FIG. 4 and generally indicates by reference numeral 8 a ventilation intake and outlet aperture. A blind hole 9 is formed of a thickness less than the thickness of rear wall 11 so as to form an extremely thin material bar 10. Bar 10 is pierced with a pin only after the gauge has been assembled at the point where the pressure measurement is to take place. Piercing bar 10 permits pressure equalization to take place.

On the inside face of the rear wall 11 of housing 3, an arrangement of a plurality of ribs 12 (FIGS. 3 and 4) may be molded to increase the sealing effect of the spring carrier, and to provide additional stability for the shape of the housing. Preferably, the arrangement of ribs 12 includes a plurality of substantially transversely extending ribs 60 which extend in a direction substantially transverse to the longitudinal axis of the opening 14 in the sidewall 13 and a plurality of substantially vertically extending ribs 62 which extend in a direction substantially parallel to the axis of the opening. A pocket 64 is formed adjacent the rear wall 11 and is provided to receive the spring carrier 42. The pocket 64 includes a reinforcing wall 66 which extends outwardly from the rearwall 11 and toward the opening 14 and reinforces the structural rigidity of the rear wall. Preferably, some of the transversely extending ribs 60 and some of the vertically extending ribs 62 extend to the reinforcing wall to provide support for the reinforcing wall. The pocket 64 is arranged to receive the spring carrier 42 in a manner shown in FIG. 6 such that the spring carrier is substantially surrounded and substantially enclosed by the ribs 60, 62 and reinforcing wall 64. Additionally, a plurality of angularly extending ribs 68 can be provided which extend along the rear wall 11 at an angle to the horizontally and vertically extending ribs 60 and 62, respectively, to further reinforce the rear wall of the housing.

Obviously, numerous modifications and variations of the present invention are possible in light of the above teachings. It is therefore to be understood that within the scope of the appended claims, the invention may be practiced otherwise than as specifically described herein.

What is claimed is:

1. A pressure gauge housing, comprising:
 a cup-shaped housing made of a synthetic material, said housing having:
 a substantially cylindrical side wall;
 a substantially circular rear wall at one end of said housing;
 an edge formed at the other end of said housing and protruding beyond said side wall;
 an opening formed in said side wall between said rear wall and said edge, said opening being adapted to receive a spring carrier;
 an O-ring sealing seat formed in said opening adapted to receive an O-ring to seal the gap between the spring carrier and said edge; and a plurality of spaced-apart ribs formed in said rear wall for reinforcing the structural rigidity of said rear wall and substantially surrounding said spring carrier when the spring carrier is positioned in said housing adjacent said rear wall.

2. A pressure gauge housing as set forth in claim 1, wherein said edge further comprises means formed therein for receiving a front ring.

3. A pressure gauge housing as set forth in claim 2, wherein said receiving means comprises a recess formed in the rear portion of said protruding edge.

4. A pressure gauge housing as set forth in claim 3, wherein said side wall further includes wedge means formed therein for snap-fitting a front ring or a cup-shaped supporting device therein.

5. A pressure gauge housing as set forth in claim 4, wherein said wedge means comprises at least three wedge-shaped depressions formed equidistantly about the periphery of said side wall.

6. A pressure gauge housing as set forth in claim 1, wherein said edge further comprises means formed therein for receiving a cup-shaped supporting device.

7. A pressure gauge housing as set forth in claim 1, wherein said rear wall includes means for providing a ventilation intake and outlet aperture.

8. A pressure gauge housing as set forth in claim 7, wherein said ventilation means comprises a blind hole of a depth slightly less than the thickness of said rear wall and having a material bar at the end thereof.

9. A pressure gauge housing as set forth in claim 1, further comprising a pocket for receiving said spring carrier, said pocket including a reinforcing wall for reinforcing the structural rigidity of said rear wall.

10. A pressure gauge housing as set forth in claim 1, wherein certain of said plurality of ribs extend substantially transversely with respect to the longitudinal axis of said opening.

11. A pressure gauge housing as set forth in claim 1, wherein certain of said plurality of ribs extend substantially parallel with respect to the longitudinal axis of said opening.

12. A pressure gauge housing as set forth in claim 1, wherein certain of said plurality of ribs extend substantially angularly with respect to the longitudinal axis of said opening.

13. A pressure gauge housing, comprising:
 a cup-shaped housing made of a synthetic material, said housing having:
 a substantially cylindrical side wall;
 a substantially circular rear wall at one end of said housing;

an edge formed at the other end of said housing and protruding beyond said side wall;

an opening formed in said side wall between said rear wall and said edge, said opening being adapted to receive a spring carrier; and a plurality of spaced-apart ribs formed in said rear wall for reinforcing the structural rigidity of said rear wall and substantially surrounding said spring carrier when the spring carrier is positioned in said housing adjacent said rear wall.

14. A pressure gauge housing as set forth in claim 13, further comprising a pocket for receiving said spring carrier, said pocket including a reinforcing wall for reinforcing the structural rigidity of said rear wall.

15. A pressure gauge housing as set forth in claim 13, wherein certain of said plurality of ribs extend substantially transversely with respect to the longitudinal axis of said opening.

16. A pressure gauge housing as set forth in claim 13, wherein certain of said plurality of ribs extend substantially parallel with respect to the longitudinal axis of said opening.

17. A pressure gauge housing as set forth in claim 13, wherein certain of said plurality of ribs extend substantially angularly with respect to the longitudinal axis of said opening.

18. A pressure gauge housing, comprising:

a cup-shaped housing made of a synthetic material, said housing having:

a substantially cylindrical side wall;

a substantially circular rear wall at one end of said housing;

an edge formed at the other end of said housing and protruding beyond said side wall;

an opening formed in said side wall between said rear wall and said edge, said opening being adapted to receive a spring carrier;

an O-ring sealing seat formed in said opening adapted to receive an O-ring to directly seal the gap between the spring carrier and said edge; and means formed in said rear wall for providing a ventilation intake and outlet aperture.

19. A pressure gauge housing as set forth in claim 18, wherein said ventilation means comprises a blind hole of a depth slightly less than the thickness of said rear wall and having a material bar at the end thereof.

20. A pressure gauge housing as set forth in claim 18, wherein said edge further comprises means formed therein for receiving a front ring.

21. A pressure gauge housing as set forth in claim 20, wherein said receiving means comprises a recess formed in the rear portion of said protruding edge.

22. A pressure gauge housing as set forth in claim 21, wherein said side wall further includes wedge means formed therein for snap-fitting a front ring or a cup-shaped supporting device therein.

23. A pressure gauge housing as set forth in claim 22, wherein said wedge means comprises at least three wedge-shaped depressions formed equidistantly about the periphery of said side wall.

24. A pressure gauge housing as set forth in claim 18, wherein said edge further comprises means formed therein for receiving a cup-shaped supporting device.

25. A pressure gauge housing as set forth in claim 18, further comprising a plurality of spaced-apart ribs formed in said rear wall for reinforcing the structural rigidity of said rear wall and substantially surrounding said spring carrier when the spring carrier is positioned in said housing adjacent said rear wall.

* * * * *